Nov. 1, 1932.   P. SCHLUMBOHM   1,885,769
USING AND STORING DRY ICE
Filed Nov. 12, 1930   2 Sheets-Sheet 1

Inventor:
Peter Schlumbohm
By: Marks & Clark Attys.

Nov. 1, 1932.  P. SCHLUMBOHM  1,885,769
USING AND STORING DRY ICE
Filed Nov. 12, 1930  2 Sheets-Sheet 2

Inventor.

Patented Nov. 1, 1932

1,885,769

UNITED STATES PATENT OFFICE

PETER SCHLUMBOHM, OF BERLIN, GERMANY, ASSIGNOR TO THE AMERICAN THERMOS BOTTLE COMPANY, OF NORWICH, CONNECTICUT, A CORPORATION OF OHIO

USING AND STORING DRY-ICE

Application filed November 12, 1930, Serial No. 495,246, and in Germany November 16, 1929.

My invention relates to methods of and means for storing solid carbon dioxide, a refrigerant generally known in the trade as dry ice. This product is an excellent freezing agent, but its very low temperature of about minus 80° C. makes it difficult to handle, particularly for storing purposes. The great difference between the temperature of dry ice and that of the surrounding air causes a rapid evaporation of the solid carbon dioxide, and it is necessary to slow down the process of evaporation to a minimum in order to keep the dry ice for a considerable period.

I accomplish the above-mentioned object by storing dry ice under a gaseous pressure of several atmospheres not exceeding 5.3, whereby the temperature of the dry ice is raised to about minus 56° C. without liquefaction of the solid carbon dioxide. I put 5.3 atmospheres as the maximum limit, because at that pressure exists the so-called triple point for carbon dioxide. This increase in the temperature of the dry ice means a decrease in the difference between that temperature and the temperature of the surrounding air, whereby the rate of evaporation is slowed down to such a point that the dry ice can be kept for an indefinite time. This is of great commercial advantage, because it enables a dry ice plant to run all the year, making the product in winter for use in summer.

In a simple embodiment of my invention, the dry ice is kept in a closed tank which is placed in a refrigerating chamber. The tank is provided with a relief valve which allows carbon dioxide gas to escape into the chamber when the pressure in the tank rises to (or closely approaches) 5.3 atmosphers. The escaped carbon dioxide gas cools the chamber, so that the tank performs the double purpose of storing the dry ice and cooling the surrounding atmosphere. The colder the temperature of this chamber, the slower is the evaporation of dry ice in the tank, which may also be provided with an outlet pipe for delivering carbon dioxide gas to any place where needed. I also provide novel means for adding fresh blocks of dry ice to the tank without releasing the pressure therein, thus avoiding the loss of carbon dioxide gas.

In another form of my invention, the storage tank comprises a series of tubes in which standard blocks of dry ice are placed so as to fill the same, leaving as little air space as possible. These storage tubes are surrounded by a refrigerating jacket consisting of tubes containing dry ice which evaporates to create a wall of very low temperature around the storage tubes.

The novel features and practical advantages of my invention will be understood from a description of the accompanying drawings, in which—

Figure 1:
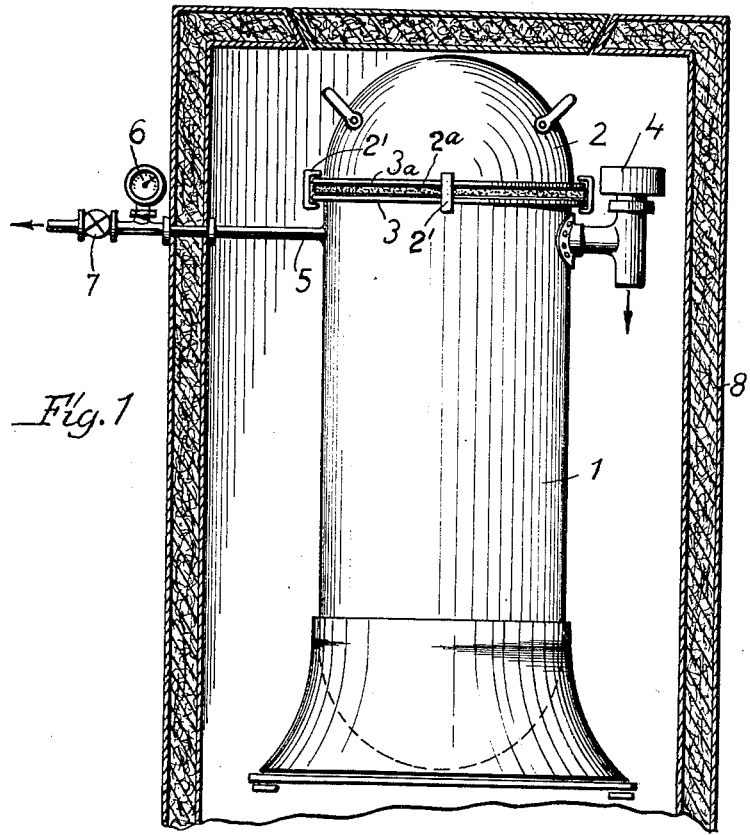
Fig. 1 shows a tank filled with dry ice and used for cooling purposes inside an ice box, a portion of which is indicated in section.

Referring to Fig. 1, a metal tank 1 adapted to hold dry ice is provided with a separate dome-shaped lid 2, which is held in place by clamps 2' engaging flanges 3 and 3a formed on the body of the tank and the lid. A packing 2a may be placed between flanges 3—3a to make the joint absolutely airtight. A relief valve 4 of suitable construction is connected to the upper portion of tank 1, and this valve is so adjusted that it permits the escape of carbon dioxide gas when the pressure in the tank reaches or approaches 5.3 atmospheres. A pipe 5 connected to tank 1 permits the discharge of gaseous carbon dioxide to any desired point for cooling purposes. A manometer 6 in pipe 5 shows the pressure of the gas and a valve 7 controls the discharge thereof. The storage tank 1 is supported in a heat-insulated chamber 8, which may be a box of suitable size for storing food and other articles to be kept cold. The carbon dioxide gas that escapes through valve 4 cools chamber 8, so that the tank 1 is surrounded by an atmosphere of low temperature which reduces the rate of evaporation of the dry ice in the tank. The metal tank 1 may be enclosed in a heat-insulating jacket to reduce the cooling effect of the gas in chamber 8.

Figure 2:
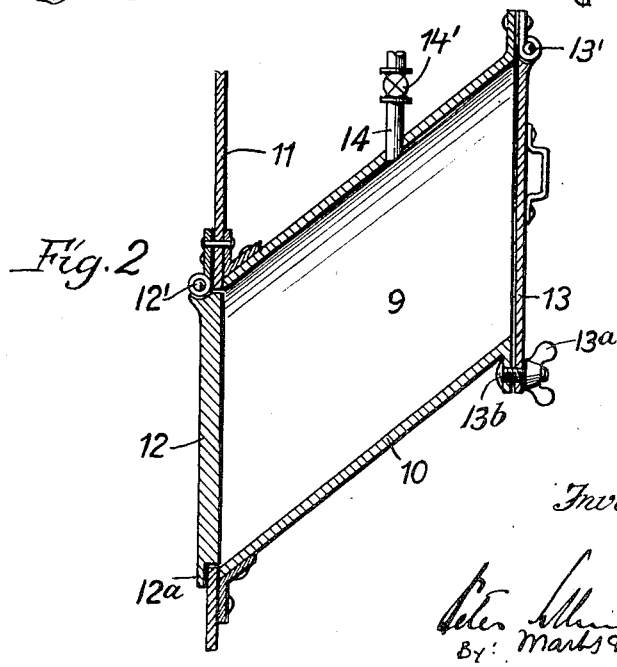
Fig. 2 is a detached sectional view of an attachment to the storage tank of Fig. 1 for filling the tank with dry ice.

It is, of course, necessary to add new blocks of dry ice to tank 1 from time to time, and I provide the tank with a filling chamber which permits the replenishing of the tank without exposing the inside thereof to the atmosphere. Referring to Fig. 2, the filling chamber 9 is formed by a downwardly slanting tube 10 which is attached to the wall 11 of tank 1 or any other pressure tank. The wall 11 has an opening normally closed by a flap door 12 hinged at 12' and having a flange 12a which bears against the wall 11 to hold the door closed by the gaseous pressure inside the tank. The tube 10 has a lid 13 hinged at 13' and held in airtight position by a releasable lock, such as a wing-nut 13a on screw 13b. A pipe 14 connected to tube 10 has a valve 14' to release the pressure in chamber 9 when necessary or desirable. As previously stated, the gaseous pressure in tank 1 normally holds the flap door 12 closed, whereby pieces of dry ice placed in chamber 9 are temporarily retained therein. It is understood that the lid 13 and valve 14' are closed when dry ice is in chamber 9, so that the evaporation of this substance exerts a counterpressure on door 12 until that pressure equals the pressure inside the tank. Thereupon the door 12 swings open under the weight of the dry ice, which slides by gravity into the tank, and then the door automatically swings back to closed position.

Figure 3:
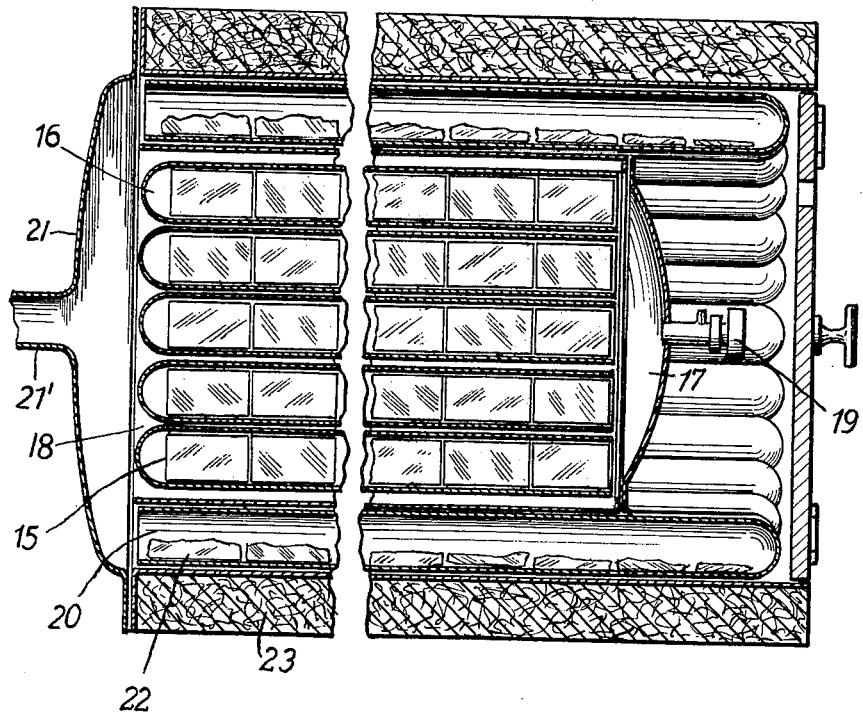
Fig. 3 represents a longitudinal section of a storage tank having tubes for holding standard blocks of dry ice.
Figure 4:
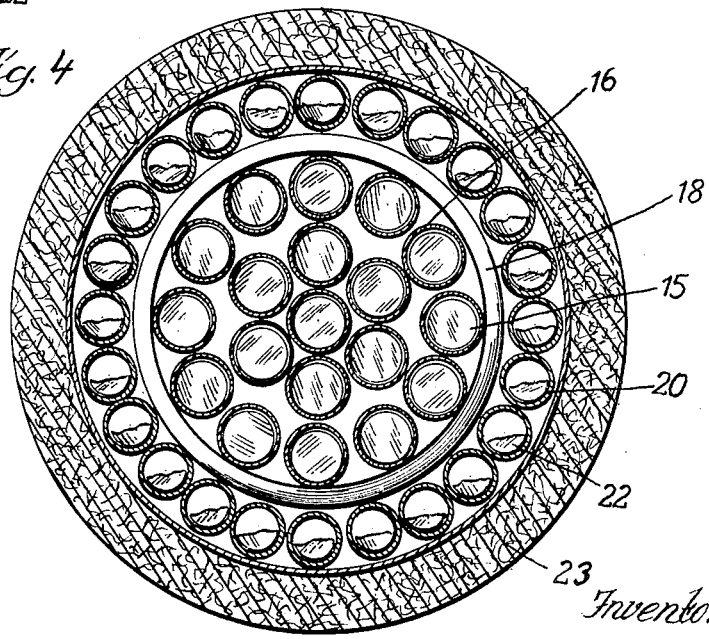
Fig. 4 is a transverse cross-section of Fig. 3.

In the modification of Figs. 3 and 4, I use a series of tubes 16 arranged closely together in cylindrical formation and open at one end for receiving blocks 15 of dry ice. These blocks are each a cylinder of certain weight or length, which may become a unit of standard for commercial dry ice. The blocks 15 fit closely in tubes 16, so that it takes only a small quantity of gas to fill the free space in each tube. It is convenient to use a cylindrical shell in which the tubes 16 are inserted and held together, with the open ends all pointing one way, and a single airtight lid 17 may be used to close off all the tubes. The lid 17 has a relief valve 19, which may be similar to valve 4 of Fig. 1, to permit the escape of gas when the pressure in tubes 16 reaches or approaches about 5 or 5.3 atmospheres. The storage tubes 16 and shell 18 are preferably surrounded by a ring of tubes 20 containing dry ice 22 for cooling the storage tubes. The open ends of cooling tubes 20 are closed by a cover 21 which has a pipe 21' connected to a pump for removing the evaporated carbon dioxide gas from tubes 20. A heat-insulating jacket 23 may surround the cooling tubes 20 to prevent a too rapid evaporation of dry ice 22. By using a plurality of tubes 16, I avoid a single huge tank which would be difficult to make safe for a pressure of five atmospheres.

It will be clear from the preceding description that in both constructions the dry ice is stored under a pressure sufficiently high to raise the temperature of the dry ice to about minus 56° C. Furthermore, the temperature outside the tank is so low that the difference between the two temperatures (inside and outside the tank) is comparatively small, whereby the rate of evaporation of the stored dry ice is correspondingly low. In fact, this evaporation can be practically stopped by maintaining the outside temperature equal to or lower than minus 56° C., so that it is possible to store dry ice for a long time with no appreciable loss in weight. It is economical to use dry ice for cooling the storage tank outside, because that makes it unnecessary for the dry ice manufacturer to buy another refrigerating agent for that purpose.

Although I have described and shown several practical constructions of my invention, it will be apparent that the invention is susceptible of embodiment in various other forms within the scope of the appended claims.

What I claim is:

1. The method of substantially preventing the evaporation of dry ice which comprises storing it under pressure to raise its normal temperature, while continuously subjecting the stored dry ice to an outside temperature at least as low as said normal temperature.

2. The method of storing dry ice which comprises holding it in a closed receptacle under pressure not exceeding 5.3 atmospheres, while subjecting said receptacle to a continuous cooling action on the outside, whereby evaporation of the stored dry ice is reduced to a minimum.

3. The method of controlling the evaporation of dry ice which comprises storing it in a closed receptacle under pressure not exceeding 5.3 atmospheres, and subjecting said receptacle on the outside to the cooling action of carbon dioxide gas at a lower pressure than said inside pressure.

4. The method of reducing the evaporation of dry ice which comprises storing it under sufficiently high pressure to raise its temperature to about minus 56° C., and subjecting the stored dry ice to a continuous cooling action at a temperature so related to said first-named temperature that the rate of evaporation of the stored dry ice is reduced to the desired degree.

5. The combination of a tank for storing dry ice, a normally closed relief valve connected to said tank and permitting the escape of gas only when the pressure in the tank reaches a certain degree not exceeding 5.3 atmospheres, and a heat-insulated enclosure surrounding said tank and spaced therefrom, the escaped gas entering said space to cool the same.

6. The combination of a tank for storing dry ice, a heat-insulated enclosure surrounding said tank and spaced therefrom, and means for subjecting said space around the tank to the cooling action of carbon dioxide gas, whereby the difference between the temperatures inside and outside the tank is reduced to a predetermined amount for correspondingly reducing the rate of evaporation of the dry ice in the tank, said means including a normally closed relief valve connected to said tank and adapted to open only when the pressure in the tank reaches a predetermined limit.

7. A storage tank for dry ice provided with an attachment which forms a closed filling chamber slanting downwardly and adapted to receive dry ice, and means whereby the dry ice deposited in said chamber automatically enters the tank when the gaseous pressure in the chamber substantially equals the gaseous presure in the tank.

8. A storage tank for dry ice provided with a hollow member which forms a closed filling chamber slanting downwardly and adapted to receive dry ice, and a movable door connecting said chamber with the inside of said tank and normally held closed by the gaseous pressure in the tank, said door being opened by the weight of the dry ice in said chamber when the gaseous pressure in the chamber counterbalances the pressure in the tank.

9. A storage device for dry ice comprising a plurality of tubes closed at one end and open at the other end, each tube being adapted to contain blocks of dry ice, a common cover for the open ends of said tubes, and a relief valve carried by said cover.

10. A storage device for dry ice comprising a plurality of tubes closed at one end and open at the other end, each tube being adapted to contain blocks of dry ice, a common cover for the open ends of said tubes, a relief valve carried by said cover, a plurality of open tubes surrounding said storage tubes and adapted to contain dry ice for cooling the storage tubes, a jacket enclosing all of said storage and cooling tubes, and means for withdrawing gases from said cooling tubes.

In testimony whereof I affix my signature.

PETER SCHLUMBOHM.